United States Patent [19]

Espevik et al.

[11] Patent Number: 4,831,213
[45] Date of Patent: May 16, 1989

[54] SWIVEL FITTING FOR ELECTRICAL CONDUIT AND THE LIKE

[75] Inventors: Craig S. Espevik, Chicago, Ill.; Christopher R. Wolf, Oak Creek, Wis.

[73] Assignee: Cooper Industries, Inc., Houston, Tex.

[21] Appl. No.: 108,880

[22] Filed: Oct. 15, 1987

[51] Int. Cl.$^4$ .............................................. H02G 3/06
[52] U.S. Cl. .................................. 174/65 R; 174/78; 403/166
[58] Field of Search ............... 174/65 R, 78; 285/158, 285/161, 382; 403/166

[56] References Cited

U.S. PATENT DOCUMENTS 4,667,062  5/1987  Espevik ........................... 174/65 R

FOREIGN PATENT DOCUMENTS 13778  6/1911  United Kingdom ............... 285/382

Primary Examiner—Arthur T. Grimley
Assistant Examiner—David A. Tone
Attorney, Agent, or Firm—Alan R. Thiele; Eddie E. Scott

[57] ABSTRACT

A swivel fitting for an electrical conduit and the like including a first fitting part including a generally cylindrical tubular section extending axially with respect to a central longitudinal axis of said first fitting part; a second fitting part having a head portion and a generally cylindrical section extending axially from said head portion and in sleeved relationship within said tubular section of said first fitting part; cooperable means on said first fitting part and said second fitting part for retaining said fitting parts in assembled relationship to each other while permitting rotation of one fitting part relative to the other fitting part about said axis, said cooperable means including a generally circumferential groove formed in said cylindrical section of said second fitting part and radially inwardly extending projection means on said tubular section of said first fitting part extending into said groove to prevent axial separation of said fitting parts; and means for exerting an axial tensioning force on said first fitting part and said second fitting part.

6 Claims, 2 Drawing Sheets

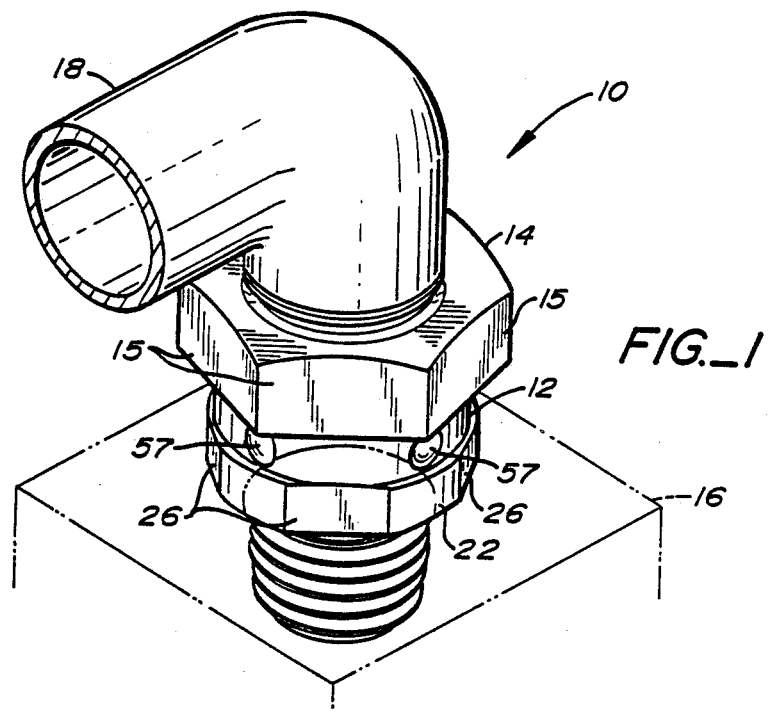
FIG._1
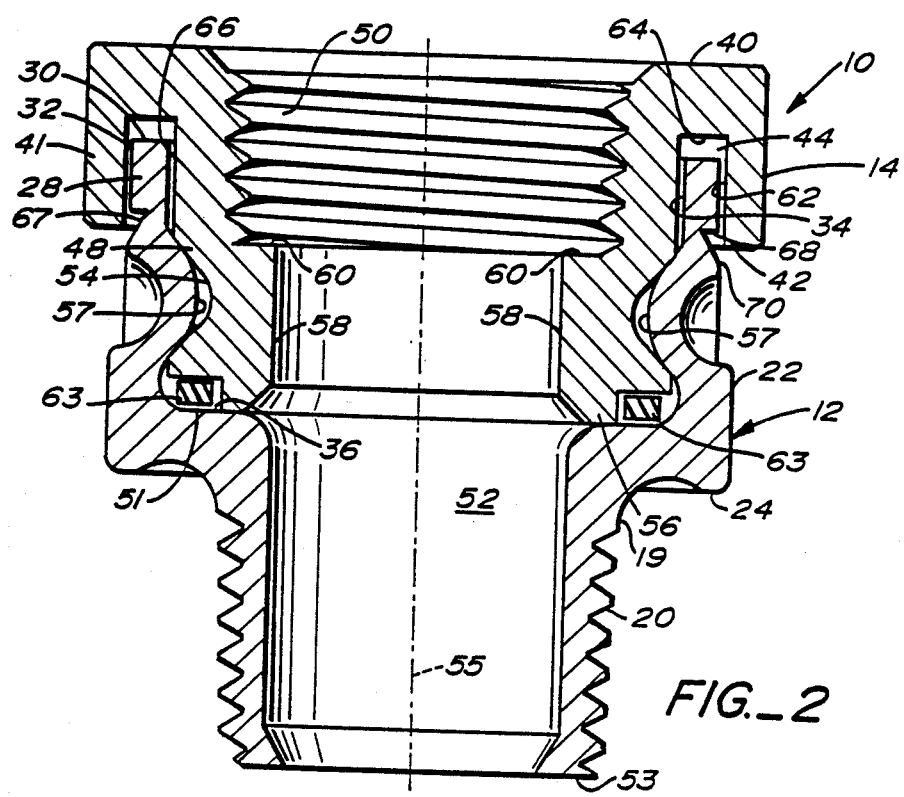
FIG._2

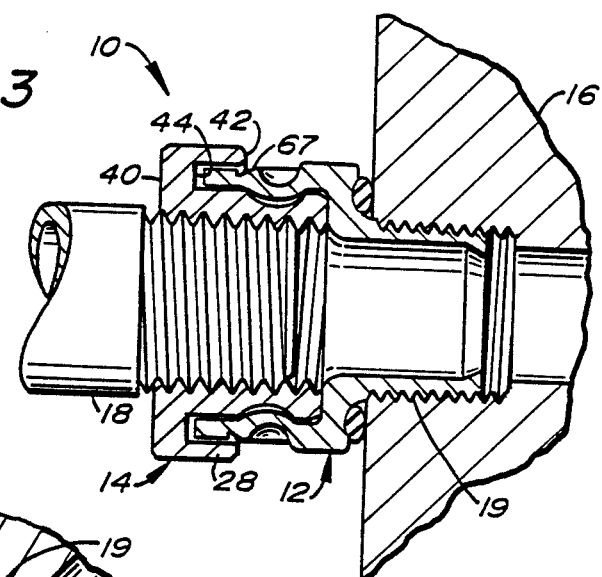
FIG._3
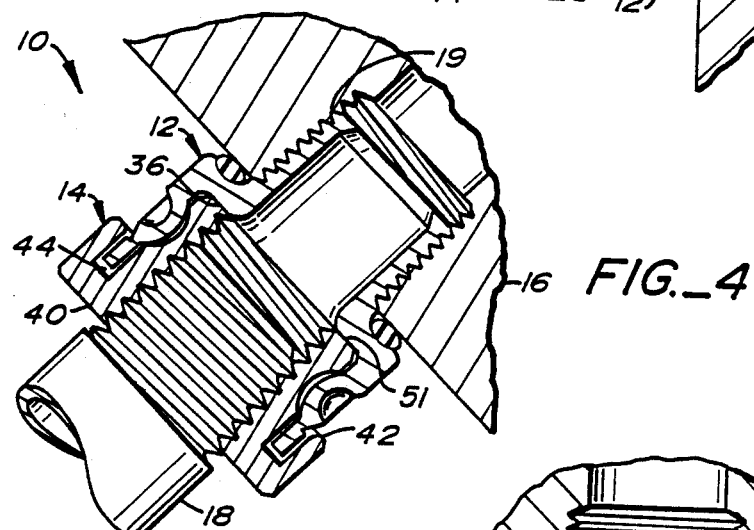
FIG._4
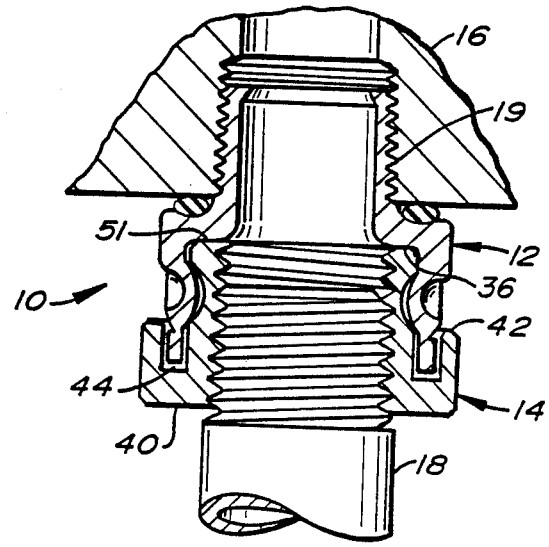
FIG._5

SWIVEL FITTING FOR ELECTRICAL CONDUIT AND THE LIKE

BACKGROUND OF THE INVENTION

1. Field of the Invention

The present invention pertains to fittings for electrical conduit and, more particularly, to an improved, rainproof, swivel fitting for electrical conduit.

2. Background of the Prior Art

As discussed in the specification of U.S. Pat. No. 4,667,062 for "Swivel Fitting for Electrical Conduit and the Like", disclosing an invention by an inventor of the present invention, various efforts have been made to develop swivel type fittings such as couplings or connectors for electrical conduit and similar structures. Several problems have been associated with previous efforts to develop swivel type fittings which are substantially rainproof and which are also operable to allow free swiveling movement of one conduit section relative to another conduit section or relative to an enclosure.

As also discussed in the specification of U.S. Pat. No 4,667,062, in many applications of electrical conduit for housing electrical connectors and the like, there is a growing need to provide a conduit connection between the machine or component which is moving relative to another and wherein free swiveling movement should be provided at some point in the conduit system. Such applications also typically do not require that the connection be completely resistant to admission of water or other fluids in the interior or wireway of the conduit if submersed, for example, but it is necessary that the connection be essentially rainproof or resistant to the admission of water in the wireway as a result of liquid spray in the vicinity of the fitting.

Certain prior art types of swivel couplings or connectors for electrical conduits and the like are typified by two or more components in a resilient gasket and wherein one component is threadedly connected to another. Upon tightening of one component relative to the other to engage the resilient sealing element, a binding action occurs which does not permit a swiveling movement and in fact eliminates any relative motion. Another type of swivel coupling or connector for electrical conduit and the like is typified by the fitting disclosed in U.S. Pat. No. 4,667,062. In its broadest terms, such a coupling includes a first fitting part, a second fitting part and cooperable means on said first fitting part and said second fitting part for retaining said fitting parts in assembled relationship to each other while permitting rotation of one fitting part relative to another. In accordance with the primary aspect of such a fitting, the first fitting part has a generally cylindrical tubular section which extends into an annular channel formed in the second fitting part comprising a nut wherein the nut and the body are retained in assembly for free swiveling movement of one part relative to the other while desirably providing a continuous electrically conductive ground path and while also providing a rainproof connection to substantially prevent entry of rain water or other liquids into the interior area or wireway of the fitting.

With respect to fittings of the second type described above, in certain cases it has been found to be desirable to enhance their abilities to carry a grounding current.

SUMMARY OF THE INVENTION

The present invention provides an improved swivel fitting of the second type described above. The swivel fitting of the present invention includes features which enhance a fitting's ability to carry a grounding current. These same features can also operate to facilitate assembly of swivel fittings.

Accordingly, it is a primary object of the present invention to provide a swivel fitting consistent in its ability to provide a continuous electrically conductive ground path.

It is another object of the present invention to provide an improved swivel fitting that is easier to manufacture than prior art swivel fittings.

Other objects, advantages and new features of the present invention will become apparent from the following detailed description of the invention when considered in conjuction with the accompanying drawings wherein:

BRIEF DESCRIPTION OF THE DRAWINGS

FIG. 1 is a perspective view of a swivel fitting in accordance with the present invention; and FIG. 2 is a central longitudinal section view of the swivel fitting illustrated in FIG. 1.

DESCRIPTION OF THE PREFERRED EMBODIMENT

The present invention is similar in many respects to the invention disclosed in U.S. Pat. No. 4,667,062. For convenience, therefore, the specification of U.S. Pat. No. 4,667,062 is hereby incorporated herein by reference.

Referring now to the drawings wherein like reference characters designate identical or corresponding parts throughout the several views and more particularly to FIG. 1, a rainproof swivel fitting in accordance with the present invention is illustrated and generally designated by the numeral 10. Fitting 10 includes a first part or body 12 and a second part or nut 14.

Referring to both FIGS. 1 and 2, the body 12 includes a generally cylindrical conduit portion 19 which may be provided with external threads 20 for threadly connecting the body with a machine element 16 or virtually any component which forms a continuation of a conductor wireway or conduit passage. Alternatively, the body 12 could be provided with internal threads for connection to an externally threaded element. The body 12 also includes an enlarged diameter portion 22 forming an external transverse shoulder 24. A plurality of wrench flats 26, best seen in FIG. 1, are preferably provided on the portion 22 for use in connecting and disconnecting body 12 with respect to a machine element 16 or other conduit section (not shown). Body 12 also includes a generally cylindrical axially extending tubular portion 28 having a transverse distal end surface 30, an outer circumferential surface 32 and an inner circumferential surface 34. The difference in diameters of the surface 34 and provides an interior transverse shoulder 36.

The fitting part or nut 14 is preferably formed to have an outer generally hexagonal configuration with opposed wrench flats 15, best seen in FIG. 1, although the part 14 may take other configurations as regards the external shape thereof. In any case, the fitting part 14 is provided with a transverse end face 40 and an opposed transverse shoulder 42 in which is formed a generally annular channel 44 which receives the distal end 30 of the tubular portion 28 of body part 12. The fitting part 14 also includes a generally cylindrical axially projecting section 48 which projects into the body part 12 in overlapping relationship with the tubular part 28. The fitting part 14 is also typically provided with internal threads 50 for connection of the fitting part 14 with a conduit section such as the conduit section 18.

Fitting portion or nut 14 of the present invention, as illustrated in the various drawings, differs from the fitting part 14 illustrated in U.S. Pat. 4,667,062 in three noteworthy respects. First, whereas the fitting part 14 in U.S. Pat. No. 4,667,062 is provided with a circumferential groove or recess 54 which preferably has a generally arcuate cross-sectional shape, nut 14 of the present invention is provided with a circumferential groove or recess 54 which preferably has a distinctive "V" shape with a radiused bottom. Second, portions of nut 14 of the present invention form a lip 56. There is no lip like lip 56 formed into nut 14 in U.S. Pat. No. 4,667,062. Third, fitting part 14 of the present invention, while having internal threads 50, also has a portion clearly defining a through-hole 58 and a portion clearly defining an end stop 60. Fitting part 14 in U.S. Pat. No. 4,667,062 in the illustrated embodiments, lacks such portions. Further details regarding and the purposes for these three noteworthy differences are discussed in further detail below.

From all of the foregoing, it should be understood that fitting parts 12 and 14 are adapted to form a continuous internal passage or wireway 52 extending between the transverse face 40 and an end face 53 of the body part 12.

The fitting parts 12 and 14 are retained in assembly with each other while providing for free swiveling or rotational movement of one part relative to the other about an axis 55 by the provision of at least two or more generally radially inwardly extending projections or dimples 57 which extend into the groove 54. The parts 12 and 14 are typically made of suitable engineering metals and the projections 57 are suitably formed of a plastic displacement of portions of the tubular section 28 at circumferentially spaced positions such as indicated in FIGS. 1 and 2.

In accordance with an important aspect of the present invention, an aspect that makes the present invention significantly different from the connector disclosed in U.S. Pat. No. 4,667,062, a wave spring 63 is positioned between engaged fitting parts 12 and 14. Wave spring 63 provides an axial tensioning force on fitting parts 12 and 14 and, therefore, insures that a continuous electrically conductive ground path is maintained at all times. Wave spring 63 has no significant dampening effect upon free rotation of the parts relative to each other however. Lip 56, in transverse end surface 51 on fitting part 14, accommodates wave spring 63. This accommodation includes serving as a pilot for locating the wave spring so that the spring remains relatively concentric with respect to the assembly and prevents it from migrating into the wireway during swiveling operation. This accommodation also includes creating a pocket for the spring to keep it away from wires so that any sharp corners on the spring will not abraid the insulation on the wires. Finally, this accommodation also includes providing a means of gauging the parts during assembly by functioning as a stop to which the body 12 and nut 14 are compressed during the dimpling operation. End stop 60 and through hole 58, mentioned above, also serve to accommodate wave spring 63 by insuring that no thread obstructions are present in areas of wave spring operation.

Channel 44 and the tubular portion 28 of body part 12 are preferably dimensioned such that a generally U-shaped clearance space is formed between the surfaces 30, 32 and 34 of the body part 12 and surfaces 62, 64 and 66 defining the channel 44.

In accordance with another important aspect of the present invention, the tubular section 28 of the body part is provided with a circumferential groove 67 defined by a transverse surface 68 extending in a plane generally normal to the axis 55 and a somewhat conical surface 70 intersecting the surface 68 and the exterior surface 32 of the tubular section 28. The groove 67 defined by the surface of 68 and 70 extends into the channel 44. In other words, the surface 68 is always displaced an axial distance from the surface 42 within the channel 44. Moreover, the surface 70 preferably does not intersect the surface 32 within the channel 44 but, in effect, the groove formed by the surfaces of 68 and 70 overlaps or bridges the entrance of the channel 44 which is delimited by the surface 42. The provision of the groove 67 is particularly advantageous in applications of the fitting 10 and generally horizontal positions of the axis 55 or near horizontal positions thereof in the way of preventing the flow of water into the interior wireway 52.

The fitting 10 may be manufactured using generally conventional manufacturing processes for forming the body part 12 and the fitting part or nut 14. The wall thickness of the tubular section 28 is sufficient to provide for plastic displacement to form the projections 57 by a conventional punching operation. The amount of radial inward displacement of material to form the projections 57 is suitably controlled so that the projections extend into the groove 54 to prevent axial separation of the parts 12 and 14. Groove 54 has a "V" shape with a radiused bottom as opposed to a arcuate shape so as to reduce sharpness of the angle of the corner at the top of the groove.

When the fitting 10 is used in an application wherein the axis 55 is extending vertically as shown in FIG. 2, or at some angle between vertical and horizontal and the fitting part 14 is generally above the body part 12, rain water or other liquids falling generally vertically or even at substantially any other angle will not enter the wireway 52 since the exterior annular rim 41 defining part of the channel 44 over lies the tubular section 28. In generally horizontal or other positions of the fitting 10, the groove 67 also, surprisingly, tends to break up any flow of water due to intense rainfall or spray tending to enter the channel 44 while preventing the flow of water through the generally U-shaped clearance shape and into the area between the exterior of the axial portion 48 and the tubular portion 28 to further preclude the possibility of water or other liquid entry into the wireway 52.

The use of fitting 10 is believed to be readily apparent to those skilled in the art upon reading the foregoing description. The assembly procedure for the fitting 10 previously described assures that there is normally an electrically conductive ground path between the parts 12 and 14.

Those skilled in the art will also recognize that the fitting parts 12, and 14 may also be modified to be used in conjunction with other fitting configurations such as, for example, the fitting described in U.S. Pat. No. 3,239,252 which is assigned to the assignee of the present invention.

Although one embodiment of the invention has been described herein in detail, those skilled in the art will recognize that the specific configuration of the fitting described herein may be modified without departing from the scope and spirit of the present invention recited in the appended claims. The drawing figures are not necessarily to scale and certain features of the invention may be shown exaggerated in scale in the interest of clarity.

We claim:

1. A swivel fitting for an electrical conduit and the like comprising:
    a first fitting part including a generally cylindrical tubular section extending axially with respect to a central longitudinal axis of said first fitting part;
    a second fitting part having a head portion and a generally cylindrical section extending axially from said head portion and in sleeved relationship within said tubular section of said first fitting part;
    cooperable means on said first fitting part and said second fitting part for retaining said fitting parts in assembled relationship to each other while permitting rotation of one fitting part relative to the other fitting part about said axis, said cooperable means including a generally circumferential groove formed in said cylindrical section of said second fitting part and radially inwardly extending projection means on said tubular section of said first fitting part extending into said groove to prevent axial separation of said fitting parts; and
    means for exerting an axial tensioning force on said first fitting part and said second fitting part, said means for exerting an axial tensioning force on said first fitting part and said second fitting part comprising wave spring.

2. An improved rainproof swivel fitting for electrical conduit and the like including at least two cooperating coupling parts, one of said fitting parts being rotatable relative to the other of said fitting parts and forming a rainproof wireway within said fitting parts free from the intrusion of rainwater and other liquids into said wireway, said fitting parts being characterized by one of said fitting parts having a body portion and an axially extending tubular section integral with said body portion and delimited by a distal end surface, the other of said fitting parts being provided with an annular channel for receiving said distal end surface of said tubular section and cylindrical section extending in sleeved relationship within said tubular section and having a distal end portion engageable with a transverse shoulder formed on said first fitting part, a generally circumferential groove formed on said cylindrical section of said other fitting part, and radially inwardly displaced portions of said tubular section extending into said groove for securing said fitting parts in assembly with each other while permitting relatively free rotation of one fitting part relative to the other; the improvement comprising means for establishing a continuous electrical conductive ground path between said fitting parts.

3. The fitting set forth in claim 2, wherein said means for establishing a continuous electrical conductive ground path between said fitting parts comprises a wave spring.

4. The fitting set forth in claim 4, wherein one of said fitting parts has a portion defining a lip which accommodates the wave spring.

5. A rainproof swivel fitting for electrical conduit or the like comprising:
    a first fitting part including a generally cylindrical tubular section extending axially with respect to a central longitudinal axis of said first fitting part, said tubular section including a circumferential groove formed on an outer surface thereof, said groove being formed by a first surface extending generally in a plane normal to said axis and a second surface intersecting said first surface and an outer circumferential surface of said tubular section;
    a second fitting part having a head portion and a generally cylindrical section extending axially from said head portion and in sleeved relationship within said tubular section of said first fitting part, said cylindrical section including a surface engageable with a cooperating surface on said first fitting part, said second fitting part including a generally annular channel for receiving a distal end of said tubular section of said first fitting part whereby the entry of rainwater into an interior wireway formed by said first and said second fitting parts is precluded in substantially all positions of said fitting, said circumferential groove formed on an outer surface of said tubular section extending at least partially into said generally annular channel to minimize the flow of water into said channel between opposed surfaces on said tubular section and a portion of said second fitting part forming said channel;
    cooperable means on said first fitting part and said second fitting part for retaining said fitting parts in assembled relationship to each other while permitting rotation of one fitting part relative to the other fitting part about said axis; and
    means for exerting an axial tensioning force on said first fitting part and said second fitting part.

6. The fitting set forth in claim 5, wherein said means for exerting an axial tensioning force on said first fitting part and said second fitting part comprises a wave spring.

* * * * *